(12) United States Patent
Andelson

(10) Patent No.: US 11,976,592 B1
(45) Date of Patent: May 7, 2024

(54) ANTI-ICING SYSTEM AND METHOD FOR AN AIRCRAFT PROPULSION SYSTEM

(71) Applicant: Rohr, Inc., Chula Vista, CA (US)

(72) Inventor: Phillip Andelson, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/092,763

(22) Filed: Jan. 3, 2023

(51) Int. Cl.
*F02C 7/047* (2006.01)
*F02C 9/18* (2006.01)

(52) U.S. Cl.
CPC ............... *F02C 7/047* (2013.01); *F02C 9/18* (2013.01); *F05D 2220/323* (2013.01); *F05D 2270/3013* (2013.01); *F05D 2270/335* (2013.01)

(58) Field of Classification Search
CPC ........ F02C 7/047; F02C 9/18; F05D 220/323; F05D 2270/3013; F05D 2270/335
See application file for complete search history.

(56) References Cited

U.S. PATENT DOCUMENTS

| | | | |
|---|---|---|---|
| 4,852,343 A * | 8/1989 | Norris | F02C 7/047 60/779 |
| 7,536,865 B2 | 5/2009 | Mikhail | |
| 8,843,253 B1 | 9/2014 | Chapman | |
| 9,341,280 B2 | 5/2016 | Pirat | |
| 9,346,549 B2 | 5/2016 | Pirat | |
| 10,421,551 B2 | 9/2019 | Greenberg | |
| 11,060,454 B2 | 7/2021 | Goodman | |
| 11,130,583 B2 | 9/2021 | Radhakrishnan | |
| 11,448,126 B1 | 9/2022 | Andelson | |
| 2010/0313573 A1 * | 12/2010 | Walters | F16K 11/0525 60/785 |
| 2020/0140098 A1 * | 5/2020 | Radhakrishnan | B64D 15/04 |
| 2022/0127005 A1 | 4/2022 | Wells | |

* cited by examiner

*Primary Examiner* — Steven M Sutherland
(74) *Attorney, Agent, or Firm* — Getz Balich LLC

(57) ABSTRACT

An anti-icing system includes a nozzle assembly, a bleed air supply, a bleed control valve assembly, and a controller. The bleed air supply is configured to direct pressurized bleed air to the nozzle assembly. The bleed air supply includes a first pressure sensor configured to measure a first pressure of the pressurized bleed air. The bleed control valve assembly includes a control valve and a valve actuator. The control valve is positionable to control a flow rate of the pressurized bleed air. The valve actuator is configured to control a position of the control valve. The controller is configured to identify a power condition of the bleed air supply as a first power condition or a second power condition and control the valve actuator to position the control valve in a fully opened position for the first power condition and in a predetermined position based on the first pressure for the second power condition.

20 Claims, 3 Drawing Sheets

ANTI-ICING SYSTEM AND METHOD FOR AN AIRCRAFT PROPULSION SYSTEM

BACKGROUND

1. Technical Field

This disclosure relates generally to an anti-icing system for an aircraft propulsion system, and more particularly to a bleed control valve assembly for controlling bleed air flow of the anti-icing system.

2. Background Information

Propulsion systems, such as those used for aircraft, may include anti-icing systems configured to remove ice or prevent the formation of ice on propulsion system surfaces (e.g., nacelle surfaces). Various types and configurations of anti-icing systems are known in the art. While these known anti-icing systems have various advantages, there is still room in the art for improvement. There is a need in the art, therefore, for an improved anti-icing system for aircraft propulsion systems.

SUMMARY

It should be understood that any or all of the features or embodiments described herein can be used or combined in any combination with each and every other feature or embodiment described herein unless expressly noted otherwise.

According to an aspect of the present disclosure, an anti-icing system for an aircraft propulsion system includes a nozzle assembly, a bleed air supply, a bleed control valve assembly, and a controller. The bleed air supply is configured to direct pressurized bleed air to the nozzle assembly. The bleed air supply includes a first pressure sensor configured to measure a first pressure of the pressurized bleed air of the bleed air supply and generate a first pressure output signal representative of the measured first pressure of the pressurized bleed air of the bleed air supply. The bleed control valve assembly includes a control valve and a valve actuator. The control valve is positionable to control a flow rate of the pressurized bleed air directed to the nozzle assembly by the bleed air supply. The valve actuator is connected to the control valve and configured to control a position of the control valve. The controller is connected in signal communication with the valve actuator and the first pressure sensor. The controller includes a processor in communication with a non-transitory memory storing instructions, which instructions when executed by the processor, cause the processor to: identify a power condition of the bleed air supply as a first power condition or a second power condition and control the valve actuator to position the control valve in a fully opened position for the first power condition and in a predetermined position based on the first pressure output signal for the second power condition.

In any of the aspects or embodiments described above and herein, the first power condition may be a low-power condition and the second power condition may be a high-power condition.

In any of the aspects or embodiments described above and herein, the instructions, when executed by the processor, may further cause the processor to identify the power condition by comparing the first pressure output signal to a power threshold value. The low-power condition may be identified with the first pressure output signal less than or equal to the power threshold value.

In any of the aspects or embodiments described above and herein, the instructions, when executed by the processor, may further cause the processor to identify the power condition by comparing the first pressure output signal to a power threshold value. The high-power condition may be identified with the first pressure output signal greater than or equal to the power threshold value.

In any of the aspects or embodiments described above and herein, the bleed control valve assembly may further include a valve position indicator in signal communication with the controller. The valve position indicator may be configured to identify the position of the control valve and generate a position output signal representative of the identified position.

In any of the aspects or embodiments described above and herein, the instructions, when executed by the processor, may further cause the processor to verify operation of the valve actuator to position the control valve for the first power condition by comparing the position output signal to an allowable position range for the control valve in the fully opened position.

In any of the aspects or embodiments described above and herein, the bleed control valve assembly may further include a second pressure sensor in signal communication with the controller. The second pressure sensor may be disposed downstream of the control valve. The second pressure sensor may be configured to measure a second pressure of the pressurized bleed air downstream of the control valve and generate a second pressure output signal representative of the measured second pressure of the pressurized bleed air downstream of the control valve.

In any of the aspects or embodiments described above and herein, the instructions, when executed by the processor, may further cause the processor to verify operation of the valve actuator to position the control valve for the second power condition by comparing the second pressure output signal to an allowable pressure range for the bleed air pressure downstream of the control valve.

In any of the aspects or embodiments described above and herein, the instructions, when executed by the processor, may further cause the processor to select the allowable pressure range based on the first pressure output signal.

In any of the aspects or embodiments described above and herein, the control valve may be a butterfly valve.

According to another aspect of the present disclosure, a method for controlling a position of a control valve for an anti-icing system of an aircraft propulsion system is provided. The method includes directing pressurized bleed air to a nozzle assembly with a bleed air supply and identifying a power condition of the bleed air supply by measuring a first pressure of the pressurized bleed air at the bleed air supply and comparing the measured first pressure to a power threshold value to identify the power condition as a first power condition or a second power condition. The first power condition is identified by the measured first pressure less than or equal to the power threshold value and the second power condition is identified by the measured first pressure greater than or equal to the power threshold value. The method further includes controlling the position of the control valve to control a flow rate of the pressurized bleed air from the bleed air supply to the nozzle assembly. Controlling the position of the control valve includes identifying the position based on identification of the first power condition or the second power condition and positioning the control valve in the identified position.

In any of the aspects or embodiments described above and herein, the first power condition may be a low-power condition and the second power condition may be a high-power condition.

In any of the aspects or embodiments described above and herein, controlling the position of the control valve based on identification of the first power condition may include positioning the control valve in a fully open position.

In any of the aspects or embodiments described above and herein, controlling the position of the control valve based on identification of the second power condition may include positioning the control valve in a selected one of a plurality of predetermined positions and selection of the selected one of the plurality of predetermined positions may be based on the measured first pressure.

According to another aspect of the present disclosure, a propulsion system for an aircraft includes a gas turbine engine and an anti-icing system. The gas turbine engine includes a compressor having a compressor outlet and a first pressure sensor. The compressor is configured to provide pressurized bleed air at the compressor outlet. The first pressure sensor is configured to measure a first pressure of the pressurized bleed air at the compressor outlet and generate a first pressure output signal representative of the measured first pressure of the pressurized bleed air at the compressor outlet. The anti-icing system includes a nozzle assembly, a bleed control valve assembly, and a controller. The anti-icing system is configured to direct the pressurized bleed air from the compressor outlet to the nozzle assembly. The bleed control valve assembly includes a control valve and a valve actuator. The control valve is positionable to control a flow rate of the pressurized bleed air directed to the nozzle assembly from the outlet. The valve actuator is connected to the control valve and configured to control a position of the control valve. The controller is connected in signal communication with the valve actuator and the first pressure sensor. The controller includes a processor in communication with a non-transitory memory storing instructions, which instructions when executed by the processor, cause the processor to: identify a power condition of the gas turbine engine as a first power condition or a second power condition using the first pressure output signal and control the valve actuator to position the control valve: in a fully opened position for the first power condition and in a predetermined position based on the first pressure output signal for the second power condition.

In any of the aspects or embodiments described above and herein, the propulsion system may further include a nacelle surrounding the gas turbine engine. The nacelle may include an air inlet section. The nozzle assembly may be disposed within the air inlet section and configured to direct the pressurized bleed air to the air inlet section.

In any of the aspects or embodiments described above and herein, the bleed control valve assembly may further include a valve position indicator in signal communication with the controller. The valve position indicator may be configured to identify the position of the control valve and generate a position output signal representative of the identified position.

In any of the aspects or embodiments described above and herein, the instructions, when executed by the processor, may further cause the processor to verify operation of the valve actuator to position the control valve for the first power condition by comparing the position output signal to an allowable position range for the control valve in the fully opened position.

In any of the aspects or embodiments described above and herein, the bleed control valve assembly may further include a second pressure sensor in signal communication with the controller. The second pressure sensor may be disposed downstream of the control valve. The second pressure sensor may be configured to measure a second pressure of the pressurized bleed air downstream of the control valve and generate a second pressure output signal representative of the measured second pressure of the pressurized bleed air downstream of the control valve.

In any of the aspects or embodiments described above and herein, the instructions, when executed by the processor, may further cause the processor to verify operation of the valve actuator to position the control valve for the second power condition by comparing the second pressure output signal to an allowable pressure range for the bleed air pressure downstream of the control valve.

The present disclosure, and all its aspects, embodiments and advantages associated therewith will become more readily apparent in view of the detailed description provided below, including the accompanying drawings.

DETAILED DESCRIPTION

Figure 1:
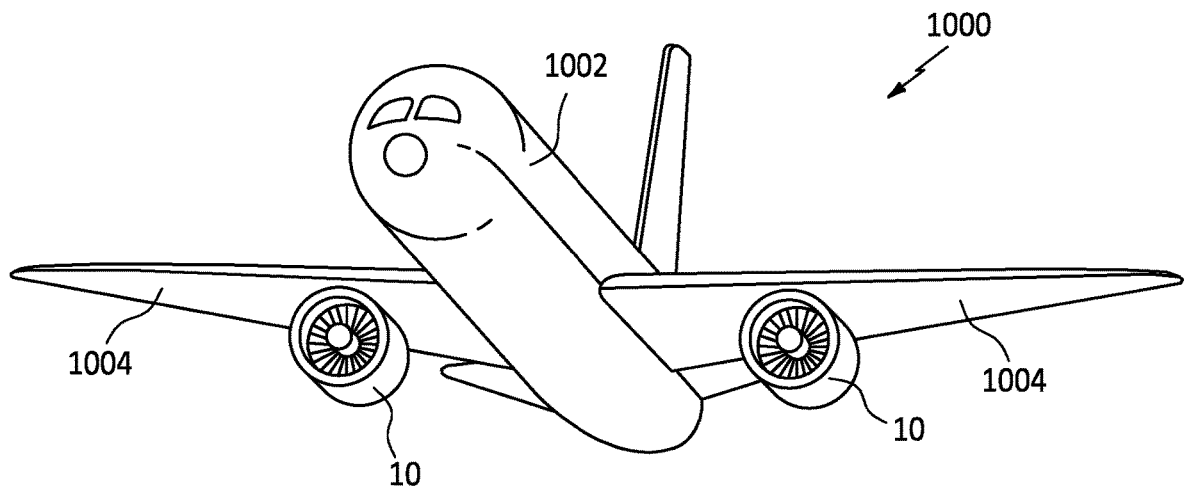
FIG. 1 illustrates a perspective view of an aircraft including propulsion systems, in accordance with one or more embodiments of the present disclosure.

FIG. 1 illustrates an aircraft 1000 including propulsion systems 10. The aircraft 1000 of FIG. 1 generally includes a fuselage 1002 and wings 1004 extending from the fuselage 1002. Each of the propulsion systems 10 of FIG. 1 are mounted to and below a respective wing 1004. The present disclosure, however, is not limited to any particular mounting configuration of the propulsion system 10 on an aircraft (e.g., the aircraft 1000).

Figure 2:
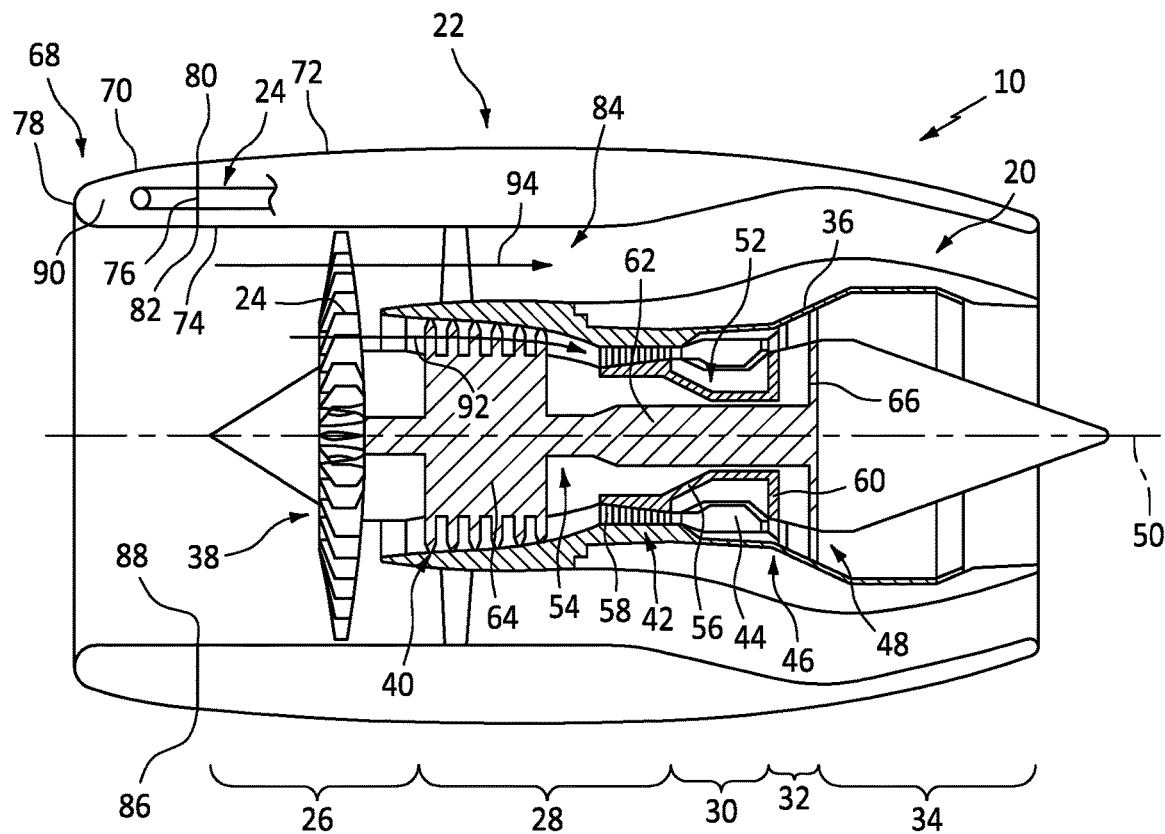
FIG. 2 illustrates a schematic, cutaway view of an aircraft propulsion system, in accordance with one or more embodiments of the present disclosure.

FIG. 2 illustrates a side, cutaway view of an exemplary configuration of the propulsion system 10. The propulsion system 10 of FIG. 2 includes a gas turbine engine 20, a nacelle 22, and an anti-icing system 24. The gas turbine engine 20 of FIG. 2 is configured as a multi-spool turbofan gas turbine engine. However, it should be understood that aspects of the present disclosure may be equally applicable to other configurations of gas turbine engines such as, but not limited to, a turboshaft gas turbine engine, a turboprop gas turbine engine, a turbojet gas turbine engine, a propfan gas turbine engine, an open rotor gas turbine engine, or the like. Aspects of the present disclosure may also be equally applicable to other types of aircraft propulsion systems such as, but not limited to, an electric-fan propulsion system, an electric-prop propulsion system, or the like.

The gas turbine engine 20 of FIG. 2 includes a fan section 26, a compressor section 28, a combustor section 30, a turbine section 32, an exhaust section 34, and an engine static structure 36. The fan section 26 includes a fan 38. The compressor section 28 may include a low-pressure compressor (LPC) 40 and a high-pressure compressor (HPC) 42. The combustor section 30 includes an annular combustor 44. The turbine section 32 may include and a high-pressure turbine (HPT) 46 a low-pressure turbine (LPT) 48.

The gas turbine engine 20 sections 26, 28, 30, 32, and 34 of FIG. 2 are arranged sequentially along an axial centerline 50 (e.g., a rotational axis) of the propulsion system 10. The engine static structure 36 may include, for example, one or more engine cases for the gas turbine engine 20. The engine static structure 36 may additionally include cowlings, bearing assemblies, or other structural components of the gas turbine engine 20. The one or more engine cases house and/or structurally support one or more of the engine sections 26, 28, 30, 32, and 34.

The gas turbine engine 20 of FIG. 1 further includes a first rotational assembly 52 (e.g., a high-pressure spool) and a second rotational assembly 54 (e.g., a low-pressure spool). The first rotational assembly 52 and the second rotational assembly 54 are mounted for rotation about the axial centerline 50 relative to the engine static structure 36.

The first rotational assembly 52 includes a first shaft 56, a bladed first compressor rotor 58 for the high-pressure compressor 42, and a bladed first turbine rotor 60 for the high-pressure turbine 46. The first shaft 56 interconnects the bladed first compressor rotor 58 and the bladed first turbine rotor 60. The second rotational assembly 54 includes a second shaft 62, a bladed second compressor rotor 64 for the low-pressure compressor 40, and a bladed second turbine rotor 66 for the low-pressure turbine 48. The second shaft 62 interconnects the bladed second compressor rotor 64 and the bladed second turbine rotor 66. The second shaft 62 may be directly or indirectly connected to the fan 38 to drive rotation of the fan 38. For example, the second shaft 62 may be connected to the fan 38 by one or more speed-reducing gear assemblies (not shown) to drive the fan 38 at a reduced rotational speed relative to the second shaft 62.

The nacelle 22 is configured to house and provide an aerodynamic cover for the propulsion system 10. The nacelle 22 of FIG. 2 extends axially along the axial centerline 50. The nacelle 22 of FIG. 2 extends circumferentially about (e.g., completely around) the axial centerline 50 to surround the gas turbine engine 20.

The nacelle 22 of FIG. 2 includes an air inlet section 68 forming a forward (e.g., axially forward) end of the nacelle 22. The air inlet section 68 extends circumferentially about (e.g., completely around) the axial centerline 50. The air inlet section 68 includes a lip skin 70, an outer barrel panel 72, an inner barrel panel 74, and a bulkhead 76 (e.g., a forward bulkhead). The lip skin 70 is arcuately shaped and forms a leading edge 78 of the nacelle 22. The lip skin 70 includes an outer radial end 80 and an inner radial end 82. The lip skin 70 extends between and to the outer barrel panel 72 and the inner barrel panel 74. The outer radial end 80 may be disposed at (e.g., on, adjacent, or proximate) or otherwise mounted to the outer barrel panel 72. The inner radial end 82 may be disposed at (e.g., on, adjacent, or proximate) or otherwise mounted to the inner barrel panel 74. The outer barrel panel 72 may form an exterior surface of the nacelle 22. The inner barrel panel 74 is spaced inward (e.g., radially inward) from the outer barrel panel 72. The inner barrel panel 74 may form a portion of a bypass duct 84 between the nacelle 22 and the gas turbine engine 20. The bulkhead 76 extends between (e.g., radially between) an outer radial end 86 of the bulkhead 76 and an inner radial end 88 of the bulkhead 76. The outer radial end 86 may be disposed contiguous with or otherwise mounted to the lip skin 70 and/or the outer barrel panel 72 at (e.g., on, adjacent, or proximate) the outer radial end 80. The inner radial end 88 may be disposed contiguous with or otherwise mounted to the lip skin 70 and/or the inner barrel panel 74 at (e.g., on, adjacent, or proximate) the inner radial end 82. The lip skin 70 and the bulkhead 76 may form an annular air inlet cavity 90 (sometimes referred to as a "D-duct") disposed axially between the lip skin 70 and the bulkhead 76. The outer barrel panel 72 and the inner barrel panel 74 may additionally form the air inlet cavity 90.

FIG. 2 schematically illustrates a portion of the anti-icing system 24. The anti-icing system 24 is configured to direct hot, pressurized air (e.g., compressor bleed air) to the air inlet cavity 90. During operation of the propulsion system 10 (e.g., during flight of the aircraft 1000, see FIG. 1), atmospheric conditions may cause the formation and/or accumulation of ice on surfaces of the nacelle 22 such as, but not limited to, exterior surfaces of the lip skin 70. The hot, pressurized air directed to the air inlet cavity 90 by the anti-icing system 24 may transfer heat energy to the lip skin 70 material, thereby removing (e.g., melting) ice from the lip skin 70 (e.g., anti-icing) and/or preventing the formation and/or accumulation of ice on the lip skin 70 (e.g., de-icing).

During operation of the propulsion system 10 of FIG. 2, ambient air enters the propulsion system 10 through the fan section 26 and is directed into a core flow path 92 and a bypass flow path 94 by rotation of the fan 38. The core flow path 92 extends generally axially along the axial centerline 50 within the gas turbine engine 20. More particularly, the core flow path 92 extends axially through the gas turbine engine 20 sections 28, 30, 32, and 34 of FIG. 2. The air within the core flow path 92 may be referred to as "core air." The core air is compressed by the bladed second compressor rotor 64 and the bladed first compressor rotor 58 and directed into a combustion chamber of the combustor 44. Fuel is injected into the combustion chamber and mixed with the compressed core air to form a fuel-air mixture. This fuel-air mixture is ignited and combustion products thereof, which may be referred to as "core combustion gas," flow through and sequentially cause the bladed first turbine rotor 60 and the bladed second turbine rotor 66 to rotate. The rotation of the bladed first turbine rotor 60 and the bladed second turbine rotor 66 respectively drive rotation of the first rotational assembly 52 and the second rotational assembly 54. Rotation of the second rotational assembly 54 further drives rotation of the fan 38, as discussed above. The bypass flow path 94 is formed outside of the gas turbine engine 20 through the bypass duct 84.

Figure 3:
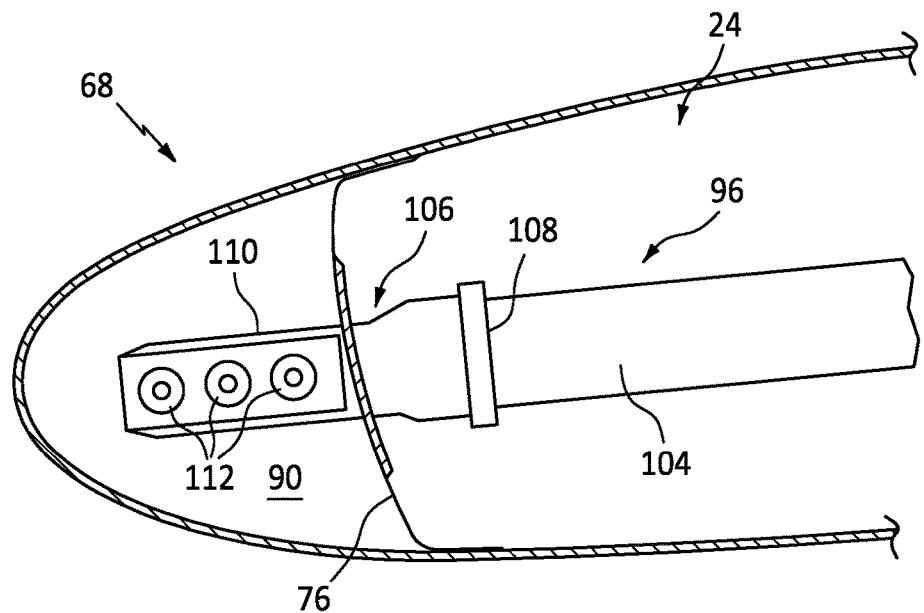
FIG. 3 illustrates a side, cutaway view of an air inlet section for an aircraft propulsion system, in accordance with one or more embodiments of the present disclosure.
Figure 4:
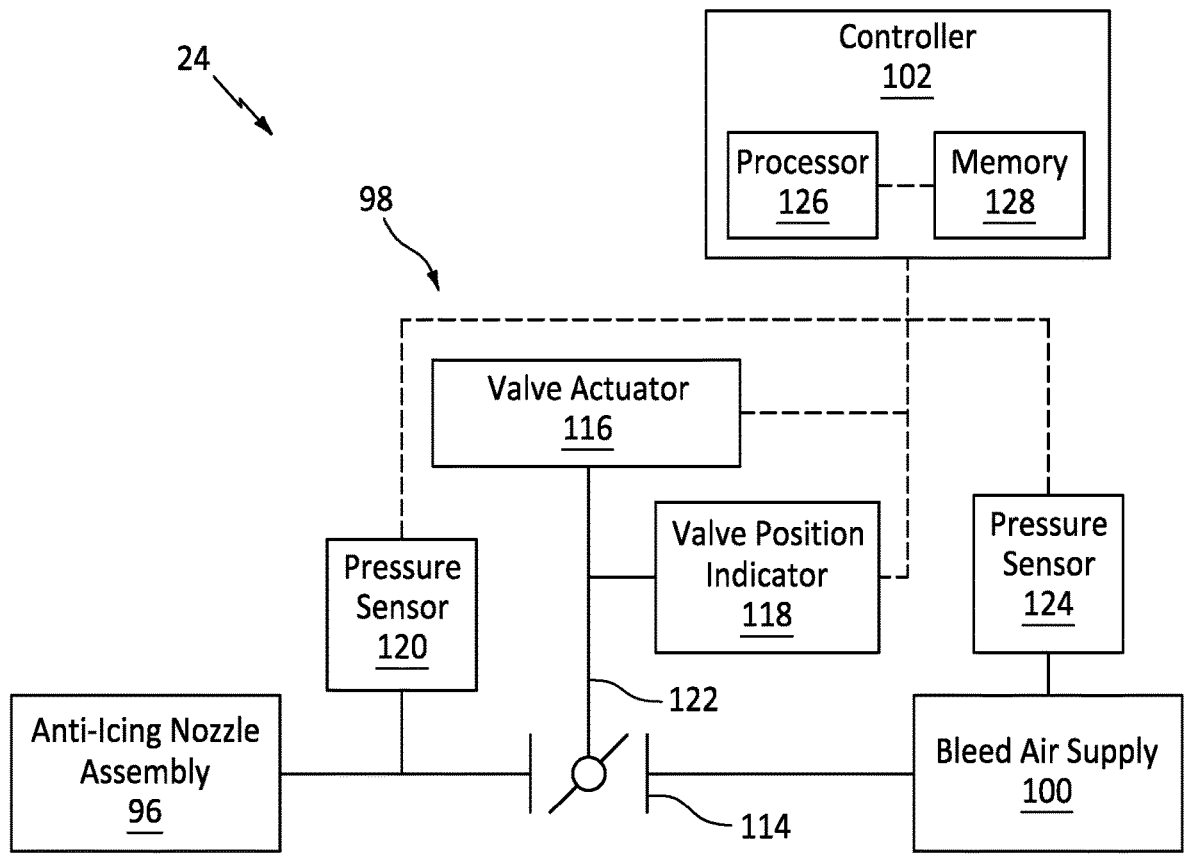
FIG. 4 illustrates schematic block diagram of an anti-icing system for an aircraft propulsion system, in accordance with one or more embodiments of the present disclosure.

Referring now to FIGS. 3 and 4, the anti-icing system 24 of FIGS. 3 and 4 includes a nozzle assembly 96, a bleed control valve assembly 98, and a bleed air supply 100. The anti-icing system 24 may further include a controller 102. The present disclosure, however, is not limited to the particular anti-icing system 24 configuration (e.g., a swirl nozzle anti-icing system) of FIGS. 3 and 4. For example, aspects of the present disclosure are also relevant to other anti-icing systems and/or other nozzle assembly configurations such as, but not limited to, piccolo tube anti-icing systems, which other anti-icing systems and/or other nozzle assembly configurations are configured to facilitate anti-icing and/or de-icing by directing hot, pressurized air (e.g., compressor bleed air).

FIG. 3 illustrates a cutaway view of the air inlet section 68 showing an exemplary configuration of the nozzle assembly 96. The nozzle assembly 96 of FIG. 3 includes a bleed air conduit 104 and a bleed air injector 106. The conduit 104 includes a distal end 108. The distal end 108 is connected in fluid communication with the bleed air injector 106. The conduit 104 is configured to direct bleed air (e.g., from the bleed air supply 100) to the bleed air injector 106 for distribution by the bleed air injector 106 into the air inlet cavity 90. The bleed air injector 106 extends through the bulkhead 76 (e.g., through an aperture in the bulkhead 76) into the air inlet cavity 90. The bleed air injector 106 may be mounted to or otherwise supported by the bulkhead 76. Alternatively, the conduit 104 may extend through the bulkhead 76 with the bleed air injector 106 disposed entirely within the air inlet cavity 90. The bleed air injector 106 includes a nozzle body 110. The nozzle body 110 forms one or more nozzles 112 configured to direct the bleed air into the air inlet cavity 90. The nozzles 112 may be configured to direct the bleed air in a circumferential direction within the air inlet cavity 90 to induce a swirling flow direction of the bleed air within the air inlet cavity 90. The present disclosure, however, is not limited to any particular orientation of the nozzles or flow direction of the bleed air within the air inlet cavity 90. While the nozzle assembly 96 is described herein as including the conduit 104 and the bleed air injector 106, it should be understood that the nozzle assembly 96 may also include a plurality of conduits 104 and a respective plurality of bleed air injectors 106.

FIG. 4 illustrates a block diagram of the anti-icing system 24. In particular, FIG. 4 illustrates the bleed control valve assembly 98 connected in fluid communication with and between the nozzle assembly 96 and the bleed air supply 100. Components of the anti-icing system 24, such as the nozzle assembly 96, the bleed control valve assembly 98, and the bleed air supply, may be connected in fluid communication using any suitable conduit (e.g., the conduit 104), which suitable conduit may include, but is not limited to, tubes, pipes, hoses, valves, etc.

The bleed control valve assembly 98 of FIG. 4 includes a control valve 114, a valve actuator 116, a valve position indicator 118, and a pressure sensor 120. The control valve 114 is connected in fluid communication between the nozzle assembly 96 and the bleed air supply 100. The control valve 114 is configured to control a flow of bleed air from the bleed air supply 100 to the nozzle assembly 96 through the control valve 114. The control valve 114 is selectively positionable in a closed position to prevent or substantially prevent the flow of bleed air to the nozzle assembly 96, an open position (e.g., a fully open position), and a plurality of intermediate positions between the closed position and the open position. The control valve 114 of FIG. 4 is configured as a butterfly valve which may generally be understood to have a range of motion between zero degrees (0°, e.g., the closed position) and ninety degrees (90°, e.g., the open position). However, the present disclosure is not limited to any particular valve configuration for the control valve 114. The control valve 114 of FIG. 4 includes a valve stem 122 operably connected to the valve actuator 116 and the valve position indicator 118.

The valve actuator 116 is configured to control the position of the control valve 114, for example, by applying a rotational force to the valve stem 122. For example, the valve actuator 116 may be configured to apply a rotational force to the valve stem 122 to position the control valve 114 in the closed position, the open position, or the plurality of intermediate positions. The valve actuator 116 may be configured as an electro-mechanical actuator (e.g., including an electric motor). The present disclosure, however, is not limited to any particular valve actuator 116 configuration and the valve actuator 116 may alternatively be configured as a hydraulic actuator, a pneumatic actuator, or the like.

The valve position indicator 118 is configured to identify (e.g., measure) a position of the control valve 114 and generate a position output signal (e.g., an electrical current, an electronic signal, etc.) which is representative of the identified position. For example, the valve position indicator 118 may measure a rotational position (e.g., rotational displacement in degrees (°) from a reference position) of the valve stem 122 to identify the position of the control valve 114. While the valve position indicator 118 is illustrated as a discrete component in FIG. 4, the valve position indicator 118 may alternatively be formed by or otherwise included in the control valve 114 or the valve actuator 116.

The pressure sensor 120 is connected in fluid communication with the nozzle assembly 96 and the control valve 114. The pressure sensor 120 is configured to measure a pressure of the bleed air between the nozzle assembly 96 and the control valve 114. For example, the pressure sensor 120 may be disposed at (e.g., on, adjacent, or proximate) or otherwise downstream of an outlet of the control valve 114 to measure the pressure of the bleed air downstream of (e.g., at the outlet of) the control valve 114. The terms "upstream" and "downstream," as used herein, should be understood to refer to a general direction of the bleed air from the bleed air supply 100 to the nozzle assembly 96. The pressure sensor 120 may be configured, for example, as a pressure transducer configured to generate a pressure output signal (e.g., an electrical current, an electronic signal, etc.) which is representative of the bleed air pressure at the pressure sensor 120.

The bleed air supply 100 is configured to supply hot, pressurized air to the nozzle assembly 96 for anti-icing and de-icing of the lip skin 70. The bleed air supply 100 may be formed, in part, by a compressor of the gas turbine engine 20, such as the low-pressure compressor 40 or the high-pressure compressor 42 (see FIG. 1). The bleed air may be supplied from an outlet or intermediate stage of the low-pressure compressor 40 or the high-pressure compressor 42. For example, the bleed air supply 100 may direct bleed air from the high-pressure compressor 42 outlet (e.g., P3 air directed to the combustor 44 from the high-pressure compressor 42) to the bleed control valve assembly 98. The present disclosure, however, is not limited to any particular bleed air source for the bleed air supply 100. The temperature for bleed air of the bleed air supply 100 may be, for example, in a range of about 150° F. (65° C.) to about 1,400° F. (760° C.). The pressure for bleed air of the bleed air supply 100 may be, for example, in a range of about 10 psig (0.7 bar) to about 600 psig (41.4 bar) or, more particularly, in a range of about 2 psig (0.14 bar) to about 550 psig (37.9 bar). The bleed air supply 100 may include a pressure sensor 124 configured to measure the pressure for bleed air of the bleed air supply 100. Like the pressure sensor 120, the pressure sensor 124 may be configured, for example, as a pressure transducer configured to generate a pressure output signal (e.g., an electrical current, an electronic signal, etc.) which is representative of the bleed air pressure at the pressure sensor 124.

The controller 102 of FIG. 4 is connected in signal communication with the valve actuator 116, the valve position indicator 118, the pressure sensor 120, and the pressure sensor 124. The controller 102 includes a processor 126 and memory 128. The memory 128 is connected in signal communication with the processor 126. The processor 126 may include any type of computing device, computational circuit, or any type of process or processing circuit capable of executing a series of instructions that are stored in the memory 128, thereby causing the processor 126 to perform or control one or more steps or other processes. The processor 126 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 128 may represent one or more algorithms for controlling aspects of the anti-icing system 24, and the stored instructions are not limited to any particular form (e.g., program files, system data, buffers, drivers, utilities, system programs, etc.) provided they can be executed by the processor 126. The memory 128 may be a non-transitory computer readable storage medium configured to store instructions that when executed by one or more processors, cause the one or more processors to perform or cause the performance of certain functions. The memory 128 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 102 may be achieved via the use of hardware, software, firmware, or any combination thereof. The controller 102 may also include input and output devices (e.g., keyboards, buttons, switches, touch screens, video monitors, sensor readouts, data ports, etc.) that enable the operator to input instructions, receive data, etc.

The controller 102 may form or otherwise be part of an electronic engine controller (EEC) for the propulsion system 10. The EEC may control operating parameters of the gas turbine engine 20 including, but not limited to, fuel flow, stator vane position (e.g., variable compressor inlet guide vane (IGV) position), compressor air bleed valve position, etc., so as to control an engine power and/or thrust of the gas turbine engine 20. In some embodiments, the EEC may be part of a full authority digital engine control (FADEC) system for the propulsion system 10.

Figure 5:
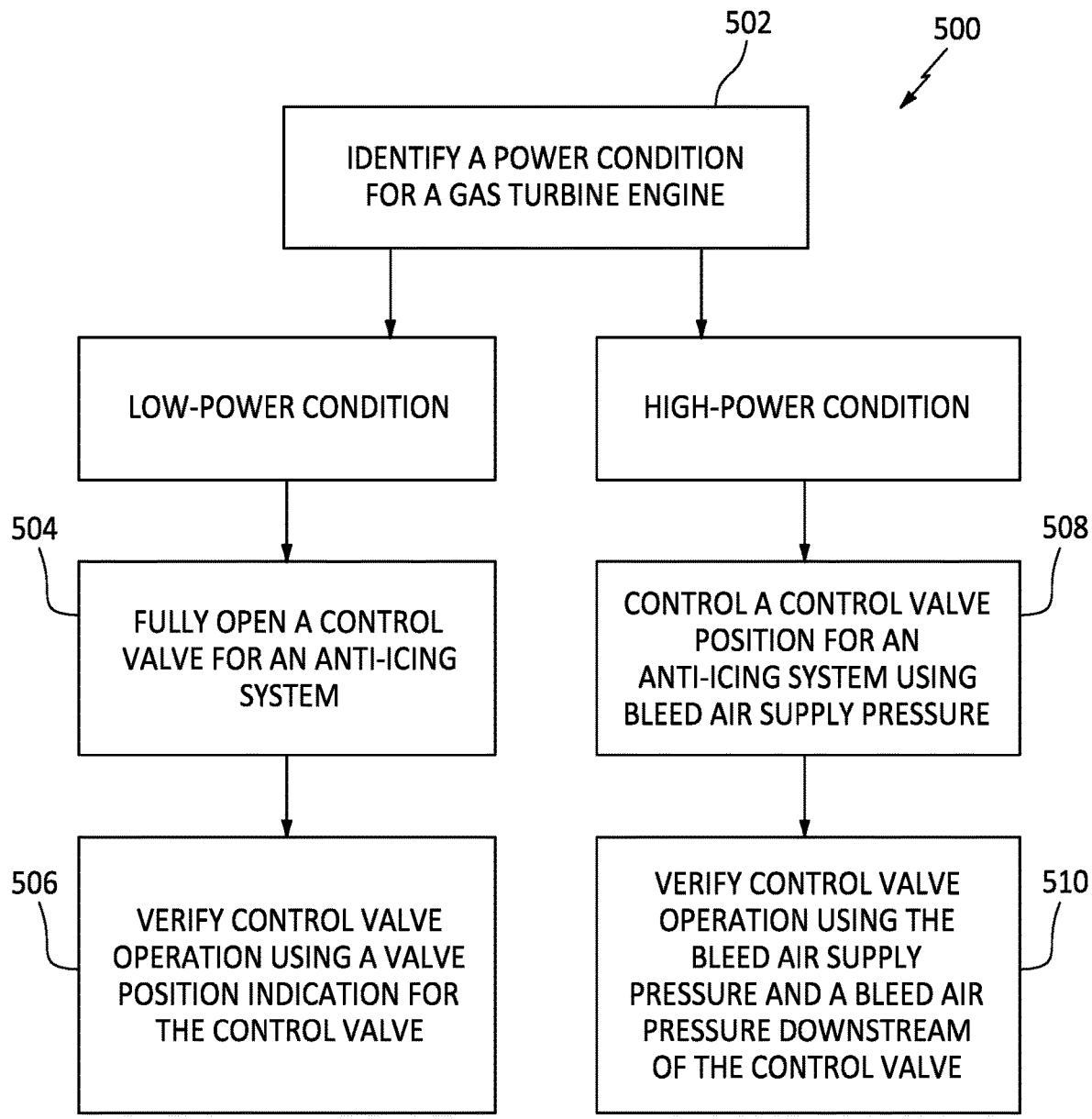
FIG. 5 illustrates a flow chart depicting a method for controlling a bleed air flow rate for an anti-icing system of an aircraft propulsion system, in accordance with one or more embodiments of the present disclosure.

Referring to FIGS. 4 and 5, a Method 500 for controlling a position of a control valve for an anti-icing system of an aircraft propulsion system in provided. FIG. 5 illustrates a flowchart for the Method 500. The Method 500 may be performed for the propulsion system 10 and its gas turbine engine 20 and anti-icing system 24, as described herein. The controller 102 may be used to execute or control one or more steps of the Method 500. For example, the processor 126 may execute instructions stored in memory 128, thereby causing the controller 102 and/or its processor 126 to execute or otherwise control one or more steps of the Method 500. However, it should be understood that the Method 500 is not limited to use with the gas turbine engine 20, the anti-icing system 24, and/or the controller 102 described herein. Unless otherwise noted herein, it should be understood that the steps of Method 500 are not required to be performed in the specific sequence in which they are discussed below and, in various embodiments, the steps of Method 500 may be performed separately or simultaneously. Further, it should be understood that not all of the steps of the method 500, discussed below, may be required unless otherwise described herein.

Step 502 includes identifying a power condition of the gas turbine engine 20. In particular, Step 502 may include identifying a first power condition (e.g., a low-power condition) or a second power condition (e.g., a high-power condition) of the gas turbine engine 20. The power condition of the gas turbine engine 20 may be identified by measuring, determining, or otherwise identifying one or more power condition variables of the gas turbine engine 20. The power condition variables may be associated with respective components of the gas turbine engine 20 and, as such, identifying the power condition of the gas turbine engine 20 may include identifying a power condition of one or more components of the gas turbine engine 20. As an example, identifying the power condition of the gas turbine engine 20 may include measuring an outlet pressure of the high-pressure compressor 42 (e.g., using the pressure sensor 124 with the bleed air supply 100 including the high-pressure compressor 42). The outlet pressure of the high-pressure compressor 42 may be measured to identify a power condition of the high-pressure compressor 42, which may be representative of a power condition of the gas turbine engine 20. In other words, identifying the power condition of the gas turbine engine 20 may include identifying a power condition (e.g., a low-power condition or a high-power condition) of the bleed air supply 100. For example, the outlet pressure of the high-pressure compressor 42 may be relatively low at a low-power condition of the gas turbine engine 20 and the outlet pressure of the high-pressure compressor 42 may be relatively high at a high-power condition of the gas turbine engine 20. Of course, the present disclosure is not limited to use of the high-pressure compressor 42 outlet pressure as a power condition variable for identifying a power condition of the gas turbine engine 20. Other power condition variables such as, but not limited to, shaft (e.g., first shaft 56 and/or second shaft 62) rotation speed, fuel flow rate (e.g., fuel injection into the combustor 44), turbine section 32 temperatures (e.g., indicated turbine temperature (ITT) of core combustion gas at the high-pressure turbine 46 outlet) may additionally or alternatively be measured, determined, or otherwise identified to identify a power condition of the gas turbine engine 20 (see FIG. 2).

Step 502 may include identifying the low-power condition or the high-power condition of the gas turbine engine 20 based on a power threshold value. For example, the controller 102 may compare a power condition variable (e.g., high-pressure compressor 42 outlet pressure from the pressure sensor 124) to a power threshold value. The controller 102 may identify a low-power condition of the gas turbine engine 20 with the power condition variable less than or equal to the power threshold value. Alternatively, the controller 102 may identify a high-power condition of the gas turbine engine 20 with the power condition variable greater than or equal to the power threshold value. As will be discussed in further detail, the power threshold value may be selected based on an expected operation of the bleed control valve assembly 98 for the different power conditions (e.g., the low-power condition and the high-power condition) of the gas turbine engine 20. The power threshold value may additionally or alternatively be selected based on expected ice formation (e.g., on the lip skin 70, see FIG. 2) for the different power conditions (e.g., the low-power condition and the high-power condition) of the gas turbine engine 20. For example, ice formation may be likely during a low-power condition of the gas turbine engine 20 (e.g., aircraft descent) but may be relatively unlikely during a high-power condition of the gas turbine engine 20. The power threshold value may be a predetermined value (e.g., stored in memory 128). The power threshold value may be experimentally and/or theoretically (e.g., computer modeled) determined. Of course, a particular value of the power threshold value may vary between different propulsion system 10 configurations, anti-icing system 24 configurations, and expected operational and/or atmospheric conditions for the propulsion assembly 10 (see FIGS. 1 and 2). Routine experimentation may be performed by a person of ordinary skill in the art to determine a suitable power threshold value in accordance with and as informed by one or more aspects of the present disclosure.

Step 504 includes positioning the control valve 114 in response to identification of a low-power condition for the gas turbine engine 20. For example, the controller 102 may control the valve actuator 116 to position the control valve 114 in the fully opened position for the low-power condition. By positioning the control valve 114 in the fully opened position, the control valve 114 may direct an increased flow rate of the bleed air from the bleed air supply 100 to the nozzle assembly 96 during the low-power condition for the gas turbine engine 20, which low-power condition may reflect an increased likelihood of ice formation on air inlet section 68 surfaces (e.g., the lip skin 70) (see FIG. 2).

Step 506 includes verifying operation (e.g., proper operation) of the bleed control valve assembly 98 (e.g., the valve actuator 116) for positioning control valve 114 for the low-power condition of the gas turbine engine 20. Operation of the control valve 114 may be verified using a measured or otherwise identified position of the control valve 114. For example, the controller 102 may compare a measured position of the control valve 114, using the position output signal from the valve position indicator 118, to an expected position value of the control valve 114 in the fully open position. The controller 102 may use the position output signal to measure or otherwise determine a rotational position (e.g., rotational displacement in degrees (°) from a reference position) of the valve stem 122 to identify the position of the control valve 114. The controller 102 may compare the position output signal to an allowable position range (e.g., the expected position value+/−X degrees (°)) for the fully open position. The allowable position range may be a predetermined range (e.g., stored in memory 128). A suitable value of the allowable position range (e.g., the X value of the expected position value+/−X degrees (°)) may be determined, for example, using thermodynamic analysis to facilitate sufficient supply of bleed air to the nozzle assembly 96 during the low-power condition. During the low-power condition of the gas turbine engine 20, the relatively lower bleed air supply pressures (e.g., from the bleed air supply 100) may make accurate control and regulation of bleed air flow rate by the bleed control valve assembly 98 more difficult using bleed air pressure (e.g., downstream of the control valve 114 such as from the pressure sensor 120). This is because the relationship between bleed air pressure (e.g., downstream of the control valve 114 such as from the pressure sensor 120) and bleed flow rate (e.g., through the control valve 114) may be relatively non-linear in the low-power condition of the gas turbine engine 20. Accordingly, verification of control valve 114 operation using control valve position in the low-power condition may facilitate improved accuracy of the regulation of bleed air flow to the nozzle assembly 96 by the bleed control valve assembly 98.

In the event the operation of the bleed control valve assembly 98 is identified to be improper or otherwise degraded (e.g., the position output signal is outside of the allowable position range) for the low-power condition of the gas turbine engine 20, the controller 102 may perform one or more corrective actions. For example, Step 506 may include generating a notification (e.g., a warning message, a warning light, an audible alarm, etc.) for a pilot, technician, or other operator(s) of the aircraft 1000 or its propulsion systems 10 (see FIG. 1), in response to the identified improper operation. Generation of the notification may additionally or alternatively include generation of a maintenance message to instruct maintenance personnel to perform an inspection, maintenance, and/or replacement of one or more components of the bleed control valve assembly 98 (e.g., prior to the next flight for the aircraft 1000).

Step 508 includes positioning the control valve 114 in response to identification of a high-power condition for the gas turbine engine 20. For example, the controller 102 may control the valve actuator 116 to position the control valve 114 in a predetermined position for the high-power condition. The predetermined position may be selected by the controller 102 based on the bleed air supply pressure from the pressure sensor 124 for the bleed air supply 100. The memory 128 may store a plurality of predetermined positions for the control valve 114, with each predetermined position corresponding to a pressure value or range of pressure values for the bleed air supply pressure from the pressure sensor 124.

Step 510 includes verifying operation (e.g., proper operation) of the bleed control valve assembly 98 (e.g., the valve actuator 116) for positioning the control valve 114 for the high-power condition of the gas turbine engine 20. Operation of the control valve 114 may be verified using a measured value of the bleed air pressure downstream of the control valve 114 (e.g., from the pressure sensor 120). For example, the controller 102 may compare a measured value of the bleed air pressure downstream of the control valve 114, using the pressure output signal from the pressure sensor 120, to an allowable pressure range of the bleed air pressure downstream of the control valve 114. The allowable pressure range may be a predetermined pressure range stored in memory 128. The memory 128 may store a plurality of predetermined pressure ranges for the bleed air pressure downstream of the control valve 114, with each predetermined pressure range corresponding to a pressure value or range of pressure values for the bleed air supply pressure from the pressure sensor 124. During the high-power condition of the gas turbine engine 20, the relatively higher bleed air supply pressures (e.g., from the bleed air supply 100) may facilitate accurate control and regulation of bleed air flow rate by the bleed control valve assembly 98 using the bleed air pressure downstream of the control valve 114 (e.g., the pressure output signal from the pressure sensor 120). This is because the relationship between bleed air pressure (e.g., downstream of the control valve 114 such as from the pressure sensor 120) and bleed flow rate (e.g., through the control valve 114) may be relatively linear in the high-power condition of the gas turbine engine 20.

In the event the operation of the bleed control valve assembly 98 is identified to be improper or otherwise degraded (e.g., the measured value of the bleed air pressure downstream of the control valve 114 is outside of the allowable pressure range of the bleed air pressure downstream of the control valve 114) for the high-power condition of the gas turbine engine 20, the controller 102 may perform one or more corrective actions. For example, Step 510 may include generating a notification (e.g., a warning message, a warning light, an audible alarm, etc.) for a pilot, technician, or other operator(s) of the aircraft 1000 or its propulsion systems 10 (see FIG. 1), in response to the identified improper operation. Generation of the notification may additionally or alternatively include generation of a maintenance message to instruct maintenance personnel to perform an inspection, maintenance, and/or replacement of one or more components of the bleed control valve assembly 98 (e.g., prior to the next flight for the aircraft 1000). Step 510 may additionally or alternatively include controlling the position of the control valve 114 by overriding the predetermined control valve position (e.g., based on the bleed air supply pressure from the pressure sensor 124 for the bleed air supply 100), with the controller 102. For example, in response to identification of the improper or otherwise degraded optional of the bleed control valve assembly 98, the controller 102 may control the valve actuator 116 to position the control valve 114 in the fully open position to facilitate suitable anti-icing system performance (e.g., sufficient prevention or removal of ice formation on air inlet section 68 surfaces (see FIG. 2)).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An anti-icing system for an aircraft propulsion system, the anti-icing system comprising:
    a nozzle assembly;
    a bleed air supply configured to direct pressurized bleed air to the nozzle assembly, the bleed air supply including a first pressure sensor configured to measure a first pressure of the pressurized bleed air of the bleed air supply and generate a first pressure output signal representative of the first pressure of the pressurized bleed air of the bleed air supply;
    a bleed control valve assembly including a control valve and a valve actuator, the control valve positionable to control a flow rate of the pressurized bleed air directed to the nozzle assembly by the bleed air supply, the valve actuator connected to the control valve and configured to control a position of the control valve; and
    a controller connected in signal communication with the valve actuator and the first pressure sensor, the controller including a processor in communication with a non-transitory memory storing instructions, which instructions when executed by the processor, cause the processor to:
        identify a power condition of the bleed air supply as a first power condition or a second power condition; and
        control the valve actuator to position the control valve:
            in a fully opened position for the first power condition; and
            in a predetermined position based on the first pressure output signal for the second power condition.

2. The anti-icing system of claim 1, wherein the first power condition is a low-power condition and the second power condition is a high-power condition.

3. The anti-icing system of claim 2, wherein the instructions, when executed by the processor, further cause the processor to:
identify the power condition by comparing the first pressure output signal to a power threshold value, the low-power condition identified with the first pressure output signal less than or equal to the power threshold value.

4. The anti-icing system of claim 2, wherein the instructions, when executed by the processor, further cause the processor to:
identify the power condition by comparing the first pressure output signal to a power threshold value, the high-power condition identified with the first pressure output signal greater than or equal to the power threshold value.

5. The anti-icing system of claim 1, wherein the bleed control valve assembly further includes a valve position indicator in signal communication with the controller, the valve position indicator configured to identify the position of the control valve and generate a position output signal representative of the identified position.

6. The anti-icing system of claim 5, wherein the instructions, when executed by the processor, further cause the processor to:
verify operation of the valve actuator to position the control valve for the first power condition by comparing the position output signal to an allowable position range for the control valve in the fully opened position.

7. The anti-icing system of claim 6, wherein the bleed control valve assembly further includes a second pressure sensor in signal communication with the controller, the second pressure sensor disposed downstream of the control valve, the second pressure sensor configured to measure a second pressure of the pressurized bleed air downstream of the control valve and generate a second pressure output signal representative of the measured second pressure of the pressurized bleed air downstream of the control valve.

8. The anti-icing system of claim 7, wherein the instructions, when executed by the processor, further cause the processor to:
verify operation of the valve actuator to position the control valve for the second power condition by comparing the second pressure output signal to an allowable pressure range for the bleed air pressure downstream of the control valve.

9. The anti-icing system of claim 8, wherein the instructions, when executed by the processor, further cause the processor to:
select the allowable pressure range based on the first pressure output signal.

10. The anti-icing system of claim 1, wherein the control valve is a butterfly valve.

11. A method for controlling a position of a control valve for an anti-icing system of an aircraft propulsion system, the method comprising:
directing pressurized bleed air to a nozzle assembly with a bleed air supply;
identifying a power condition of the bleed air supply by measuring a first pressure of the pressurized bleed air at the bleed air supply and comparing the measured-first pressure to a power threshold value to identify the power condition as a first power condition or a second power condition, the first power condition identified by the measured-first pressure less than or equal to the power threshold value and the second power condition identified by the measured-first pressure greater than or equal to the power threshold value; and
controlling the position of the control valve to control a flow rate of the pressurized bleed air from the bleed air supply to the nozzle assembly, controlling the position of the control valve including identifying the position based on identification of the first power condition or the second power condition and positioning the control valve in the identified position.

12. The method of claim 11, wherein the first power condition is a low-power condition and the second power condition is a high-power condition.

13. The method of claim 12, wherein controlling the position of the control valve based on identification of the first power condition includes positioning the control valve in a fully open position.

14. The method of claim 13, wherein:
controlling the position of the control valve based on identification of the second power condition includes positioning the control valve in a selected one of a plurality of predetermined positions; and
selection of the selected one of the plurality of predetermined positions based on the first pressure.

15. A propulsion system for an aircraft, the propulsion system comprising:
a gas turbine engine including a compressor having a compressor outlet and a first pressure sensor, the compressor configured to provide pressurized bleed air at the compressor outlet, the first pressure sensor configured to measure a first pressure of the pressurized bleed air at the compressor outlet and generate a first pressure output signal representative of the first pressure of the pressurized bleed air at the compressor outlet; and
an anti-icing system including a nozzle assembly, a bleed control valve assembly, and a controller, the anti-icing system configured to direct the pressurized bleed air from the compressor outlet to the nozzle assembly, the bleed control valve assembly including a control valve and a valve actuator, the control valve positionable to control a flow rate of the pressurized bleed air directed to the nozzle assembly from the outlet, the valve actuator connected to the control valve and configured to control a position of the control valve, the controller connected in signal communication with the valve actuator and the first pressure sensor, the controller including a processor in communication with a non-transitory memory storing instructions, which instructions when executed by the processor, cause the processor to:
identify a power condition of the gas turbine engine as a first power condition or a second power condition using the first pressure output signal; and
control the valve actuator to position the control valve:
in a fully opened position for the first power condition; and
in a predetermined position based on the first pressure output signal for the second power condition.

16. The propulsion system of claim 15, further comprising a nacelle surrounding the gas turbine engine, the nacelle including an air inlet section, the nozzle assembly disposed within the air inlet section and configured to direct the pressurized bleed air to the air inlet section.

17. The propulsion system of claim 15, wherein the bleed control valve assembly further includes a valve position indicator in signal communication with the controller, the valve position indicator configured to identify the position of the control valve and generate a position output signal representative of the identified position.

18. The propulsion system of claim 17, wherein the instructions, when executed by the processor, further cause the processor to:
   verify operation of the valve actuator to position the control valve for the first power condition by comparing the position output signal to an allowable position range for the control valve in the fully opened position.

19. The propulsion system of claim 18, wherein the bleed control valve assembly further includes a second pressure sensor in signal communication with the controller, the second pressure sensor disposed downstream of the control valve, the second pressure sensor configured to measure a second pressure of the pressurized bleed air downstream of the control valve and generate a second pressure output signal representative of the measured second pressure of the pressurized bleed air downstream of the control valve.

20. The propulsion system of claim 19, wherein the instructions, when executed by the processor, further cause the processor to:
   verify operation of the valve actuator to position the control valve for the second power condition by comparing the second pressure output signal to an allowable pressure range for the bleed air pressure downstream of the control valve.

* * * * *